(12) United States Patent
Kobayashi et al.

(10) Patent No.: US 12,480,894 B2
(45) Date of Patent: Nov. 25, 2025

(54) METHOD FOR MANUFACTURING REFERENCE PIECE FOR X-RAY MEASUREMENT OF RESIDUAL STRESS AND REFERENCE PIECE FOR X-RAY MEASUREMENT OF RESIDUAL STRESS

(71) Applicant: SINTOKOGIO, LTD., Nagoya (JP)

(72) Inventors: Yuji Kobayashi, Toyokawa (JP); Akinori Matsui, Toyokawa (JP); Yuta Saito, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 400 days.

(21) Appl. No.: 17/441,049

(22) PCT Filed: Dec. 13, 2019

(86) PCT No.: PCT/JP2019/048869
§ 371 (c)(1),
(2) Date: Apr. 22, 2022

(87) PCT Pub. No.: WO2020/194909
PCT Pub. Date: Oct. 1, 2020

(65) Prior Publication Data
US 2023/0160843 A1    May 25, 2023

(30) Foreign Application Priority Data
Mar. 25, 2019 (JP) ................. 2019-056039

(51) Int. Cl.
*G01N 23/20008* (2018.01)
*B24C 1/10* (2006.01)
(Continued)

(52) U.S. Cl.
CPC ......... *G01N 23/20008* (2013.01); *B24C 1/10* (2013.01); *C21D 1/00* (2013.01);
(Continued)

(58) Field of Classification Search
CPC .... B24C 1/10; B24C 1/00; C21D 1/00; C21D 1/30; C21D 7/00; C21D 7/06; C21D 8/00;
(Continued)

(56) References Cited

U.S. PATENT DOCUMENTS

| | | | | |
|---|---|---|---|---|
| 2014/0143992 A1* | 5/2014 | Xiong | ................ | C21D 9/0068 29/90.01 |
| 2014/0161600 A1* | 6/2014 | Iwaki | ................ | F04D 3/02 427/230 |

(Continued)

FOREIGN PATENT DOCUMENTS

| | | | |
|---|---|---|---|
| CN | 102851663 B | * | 6/2016 |
| JP | 2001220650 A | * | 8/2001 |

(Continued)

OTHER PUBLICATIONS

Dieter Schmid Fine Tools, Conversion Chart Abrasives—Grit, 2025, pp. 1-3 (Year: 2025).*

(Continued)

*Primary Examiner* — Jonathan Johnson
(74) *Attorney, Agent, or Firm* — Oliff PLC

(57) ABSTRACT

A metal material other than strain-free iron powder can be used as a reference piece for X-ray measurement of residual stress. The metal material is manufactured by nanocrystallizing at least a portion of a surface of a metal material, and then removing inherent strain by annealing the metal material, thereby eliminating stress.

10 Claims, 1 Drawing Sheet

(51) Int. Cl.
- *C21D 1/00* (2006.01)
- *C21D 1/30* (2006.01)
- *C21D 7/00* (2006.01)
- *C21D 7/06* (2006.01)
- *C21D 8/00* (2006.01)
- *C21D 9/00* (2006.01)
- *G01N 1/44* (2006.01)

(52) U.S. Cl.
CPC ............... *C21D 1/30* (2013.01); *C21D 7/00* (2013.01); *C21D 7/06* (2013.01); *C21D 8/00* (2013.01); *C21D 8/005* (2013.01); *C21D 9/00* (2013.01); *G01N 1/44* (2013.01); *G01N 2223/3037* (2013.01); *G01N 2223/607* (2013.01)

(58) Field of Classification Search
CPC . C21D 8/005; C21D 9/00; G01N 1/44; G01N 2223/3037; G01N 2223/607

See application file for complete search history.

(56) References Cited

U.S. PATENT DOCUMENTS

| | | | |
|---|---|---|---|
| 2016/0107292 A1* | 4/2016 | Sawada | B24C 11/00 72/53 |
| 2017/0167988 A1 | 6/2017 | Kobayashi et al. | |

FOREIGN PATENT DOCUMENTS

| | | |
|---|---|---|
| JP | 2009-270150 A | 11/2009 |
| JP | 2017-009356 A | 1/2017 |
| JP | 2018-124243 A | 8/2018 |

OTHER PUBLICATIONS

"JSMS-SD-5-02: Standard for X-Ray Stress Measurement (2002) Iron and Steel;" Society of Materials Science, Japan; p. 73; 2002.

Paradowska et al; "Investigation of reference samples for residual strain measurements in a welded specimen by neutron and synchrotron X-ray diffraction;" Physica B; pp. 904-907; 2006.

Suzuki et al; "Discussion on Accuracy of Weld Residual Stress Measurement by Neutron Diffraction—Influence of Strain Free Reference—" Journal of the Society of Materials Science, Japan; vol. 61; No. 7; pp. 604-611; Jul. 2012.

* cited by examiner

[Fig. 1]
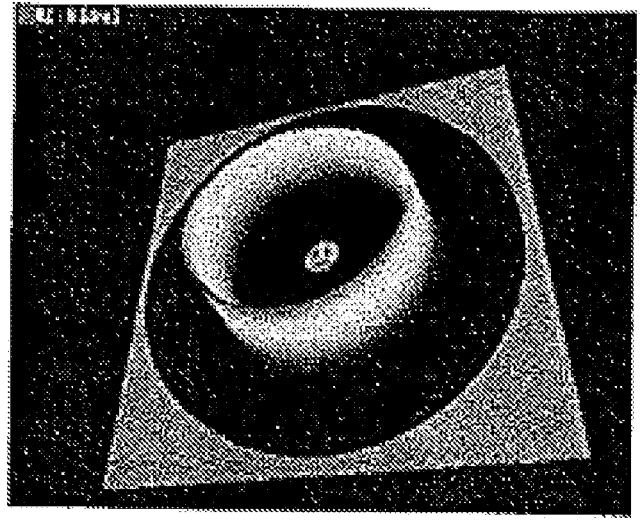
[Fig. 2]
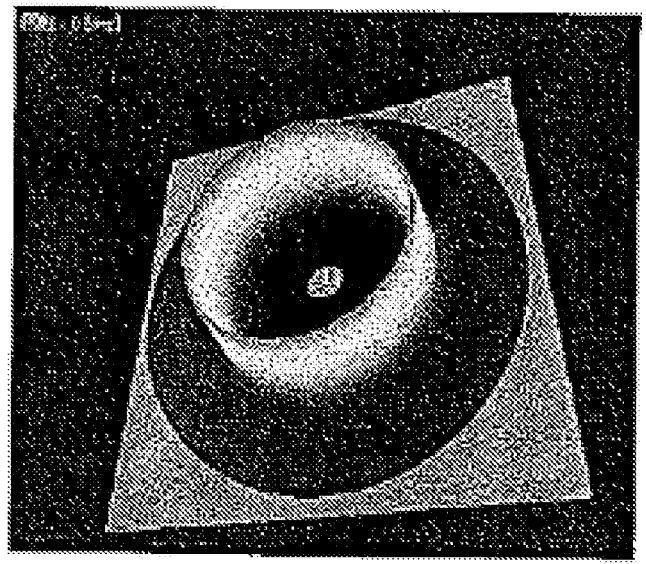

METHOD FOR MANUFACTURING REFERENCE PIECE FOR X-RAY MEASUREMENT OF RESIDUAL STRESS AND REFERENCE PIECE FOR X-RAY MEASUREMENT OF RESIDUAL STRESS

TECHNICAL FIELD

The present invention relates to a method for manufacturing a reference piece for X-ray measurement of residual stress and a reference piece for X-ray measurement of residual stress.

BACKGROUND

In order to confirm that a measuring instrument is operating normally in X-ray measurement of residual stress, the Society of Materials Science, Japan recommends measuring a reference piece using strain-free iron powder and confirming whether or not a result close to 0 MPa (free of stress) is measured (Non-Patent Document 1). Strain-free iron powder is a substance wherein iron powder that is nearly pure iron and has been sufficiently annealed has been solidified using an adhesive or the like. Using this, it can be understood that an instrument for X-ray measurement of residual stress is operating normally.

In recent years, the use of instruments for X-ray measurement of residual stress in industrial fields has become common. In industrial fields, there is the potential demand to make materials used in manufacturing the subject of measurement. That is, there is the potential demand to make substances other than strain-free iron powder the subject of reference pieces for X-ray measurement of residual stress. For example, in a spring manufacturing company there would be demand for using spring materials in reference pieces for X-ray measurement of residual stress and, in a gear manufacturing company there would be demand for using the steel materials used in gears in reference pieces for X-ray measurement of residual stress.

CITATION LIST

Non-Patent Literature

Non-Patent Document 1: The Society of Materials Science, Japan, Standard for X-Ray Stress Measurement (2002) =Iron and Steel=, p. 73

SUMMARY OF INVENTION

Technical Problem

The present invention addresses the problem of providing a metal material other than strain-free iron powder as a reference piece for X-ray measurement of residual stress.

Solution to Problem

The present inventors discovered that the abovementioned problem can be solved by, after at least a portion of a surface of a metal material has been nanocrystallized, removing inherent strain by means of annealing to eliminate stress and arrived at the present invention.

That is, the present invention relates to (1)-(14) below.

(1) A manufacturing method for a reference piece for X-ray measurement of residual stress, characterized by, after at least a portion of a surface of a metal material has been nanocrystallized, stress being eliminated by annealing the same.

(2) The manufacturing method for a reference piece for X-ray measurement of residual stress described in (1), wherein the nanocrystallization is performed by shot peening.

(3) The manufacturing method for a reference piece for X-ray measurement of residual stress described in (2), characterized by the orientation of the metal material being canceled by shot peening.

(4) The manufacturing method for a reference piece for X-ray measurement of residual stress described in (2) or (3), characterized by only crystal grains that can withstand X-ray measurement of residual stress being left in the metal material by shot peening.

(5) The manufacturing method for a reference piece for X-ray measurement of residual stress described in any one of (1) to (4), wherein nanocrystals are present on the metal material surface in the range of 0-50 µm.

(6) The reference piece for X-ray measurement of residual stress described in any one of (1) to (5), wherein the metal material is an alloy having iron as a main component.

(7) The manufacturing method for a reference piece for X-ray measurement of residual stress described in any one of (1) to (6), wherein the residual stress in the reference piece for X-ray measurement of residual stress is −55 MPa or greater and 55 MPa or less.

(8) A reference piece for X-ray measurement of residual stress, characterized by at least a portion of a surface of a metal material being nanocrystallized and stress being eliminated by annealing.

(9) The reference piece for X-ray measurement of residual stress described in (8), wherein the nanocrystallization is performed by shot peening.

(10) The reference piece for X-ray measurement of residual stress described in (9), characterized by the orientation of the metal material being canceled by shot peening.

(11) The reference piece for X-ray measurement of residual stress described in (9) or (10), characterized by only crystal grains that can withstand X-ray measurement of residual stress being left in the metal material by shot peening.

(12) The reference piece for X-ray measurement of residual stress described in any one of (8) to (11), wherein nanocrystals are present on the metal material surface in the range of 0-50 µm.

(13) The reference piece for X-ray measurement of residual stress described in any one of (8) to (12), wherein the metal material is an alloy having iron as a main component.

(14) The reference piece for X-ray measurement of residual stress described in any one of (8) to (13), wherein the residual stress is −55 MPa or greater and 55 MPa or less.

Effects of Invention

According to the present invention, a metal material other than strain-free iron powder can be provided as a reference piece for X-ray measurement of residual stress.

BRIEF DESCRIPTION OF DRAWINGS

FIG. 1 shows a Debye-Scherrer ring obtained when a raw spring material was annealed. The Debye-Scherrer ring is distorted, so it is understood that the effects when rolled remain even after annealing.

FIG. 2 shows a Debye-Scherrer ring obtained when, after annealing a metal material of which at least a portion of a surface thereof had been nanocrystallized by shot peening, the metal material was irradiated with X-rays. The orientation when rolled is eliminated by shot peening, so an orientation is not observed after annealing.

DESCRIPTION OF EMBODIMENTS

The present invention is not limited to the following embodiments and can be implemented by adding changes, as appropriate, so long as the changes do not hinder the effects of the present invention. In the present invention, "A-B" means "A or greater and B or less."

Crystallinity is critical for stress-free reference pieces for X-ray measurement of residual stress. When measuring with X-rays, the conditions that (1) crystal grains should not coarsen, (2) there should be no orientation, that is, the direction of the crystals should not be aligned anywhere, and (3) the measurement results are obtained near 0 MPa (free of stress) are required. In (3), a stress measurement coefficient is multiplied by the slope obtained from a $\cos \alpha$ graph or a $\sin 2\Psi$ graph, so in actuality, 0 MPa cannot be calculated. Accordingly, some degree of variation in the numerical values is permitted.

One embodiment of the present invention shall be explained in detail below.

[Nanocrystallization of the Surface of the Metal Material]

In the present invention, any method, so long as it is a means capable of nanocrystallization, can be used in the nanocrystallization of the surface of the metal material. For example, shot peening, ECAP (Equal-Channel Angular Pressing) methods, and HPT (High-Pressure Torsion) methods can be used. Among these, shot peening is preferred because it is capable of canceling the orientation of the metal material and, by setting conditions under which nanocrystals are generated on the surface of the metal material, even if crystallization conditions were to be met when annealing, it is capable of leaving only crystal grains that can withstand X-ray measurement of residual stress in the metal material. In the present invention, "canceling the orientation of the metal material" means scattering the orientation of metal crystal planes facing in the same direction generated by the manufacturing process by recrystallizing/micronizing the same largely by means of shot peening. Further, in the present invention, "only crystal grains that can withstand X-ray measurement of residual stress" means that a certain number of crystal grains for obtaining reliability in the results of the X-ray measurement of residual stress are present within the range of the X-ray measurement of residual stress.

As conditions for the shot peening, the hardness and particle diameter of the projected material and the projection speed must be selected according to the type of the metal material. For example, the hardness of the projected material is appropriately selected from the Vickers hardness (JIS Z 2244) range of HV 1200-3000 (preferably HV 1700-3000) and the grain size number (JIS R 6001) appropriately selected from the range of 20-220 (preferably 30-100). Further, for the projection speed, for example, when projecting (jetting) the projected material using an air acceleration device, the projection air pressure is selected, as appropriate, from the range of 0.05-1.0 MPa (preferably 0.1-0.5 MPa).

Nanocrystallization means crystallization on the nano scale. In the present invention, the grain diameter of the nanocrystals is preferably 1-50 nm, more preferably 1-10 nm, and yet more preferably 1-5 nm.

[Elimination of Stress by Annealing]

Annealing (tempering) means a process for heating a metal material to a suitable temperature and, after maintaining this temperature for a certain amount of time, slow-cooling. Annealing has effects such as the elimination of internal stress, the reduction of hardness, and the improvement of workability. In the present invention, "eliminating stress" means getting the residual stress of the reference piece as close to 0 MPa as can be by eliminating only the strain generated by working.

The number of times annealing is performed is preferably from 3 to 5. Further, by annealing at 720° or lower, coarsening of carbides is prevented and the micro state of carbides prior to quenching is maintained. Annealing is preferably performed by using a bright annealing furnace to heat to 180-500° C., more preferably to heat to 300-500° C., and yet more preferably to heat to 450-500° C. By using a bright annealing furnace, there is no generation of oxide scales on the surface of the metal material and a pickling process becomes unnecessary.

[Range in which the Nanocrystals are Present]

In the present invention, the nanocrystals are preferably present in a range of 0-50 μm on the metal material surface (in other words, a range of up to 50 μm in depth from the outermost surface), more preferably present in a range of 0-15 μm, and yet more preferably present in a range of 0-10 μm.

[Metal Material]

Various types of metal materials can be used in the present invention. Alloys having iron as a main component are preferred as the metal material in the present invention, in particular SCM (steel chromium molybdenum steel materials), SUP (spring steel steel materials), SPCC (normal steel), SPHC (general hot-rolled steel materials), and S10C (carbon steel for machine structures) are preferably used and SCM and SUP are more preferably used.

[Residual Stress of the Reference Piece for X-Ray Measurement of Residual Stress]

In the present invention, the residual stress of the reference piece for X-ray measurement of residual stress is preferably −55-55 MPa, more preferably −25-25 MPa, and yet more preferably −10-10 MPa.

Examples

The following examples are shown to more specifically explain the present invention, but the present invention is not limited by these examples.

[Shot Peening (SP)]

Shot peening (SP) was performed on SCM, SUP, SPCC, SPHC, and S10C under the conditions shown in Table 1 and nanocrystal layers formed on the surfaces of the metal materials.

[Annealing (Thermal Treatment)]

Next, annealing (thermal treatment) was performed under the conditions shown in Table 1 and stress eliminated.

Those cells in which "−" is written in Table 1 indicate that the relevant treatment was not performed.

Measurement of the residual stress for each piece was performed using the residual stress measurement instrument described in JP 2017-009356 A. The results are shown in Table 1.

TABLE 1

| | MATERIAL | | | | | | |
|---|---|---|---|---|---|---|---|
| | SCM | | | | SUP | | |
| | THERMAL TREATMENT | | | | | | |
| | ANNEALING — | ANNEALING — | ANNEALING VACUUM CARBURIZATION | ANNEALING — | ANNEALING — | ANNEALING QUENCHING AND TEMPERING HV 500 | ANNEALING QUENCHING AND TEMPERING HV 450 |
| SHOT MATERIAL | RCW03PS | AM150B | — | — | RCW03PS | RCW03PS | RCW03PS |
| SHOT TECHNIQUE | AIRYPE | | | | | AIR PRESSURE | |
| PROJECTION PRESSURE [MPa] | 0.1 | 0.1 | — | — | 0.1 | 0.1 | 0.1 |
| JETTING TIME [min] | 2 | 1 | — | — | 1 | 1 | 1 |
| RESIDUAL STRESS [MPa] | −34 | −31 | 5 | −31 | −29 | −30 | −40 |
| HALF-WIDTH [deg] | 2.5 | 2.5 | 2.61 | 2.55 | 2.46 | 2.52 | 2.32 |
| COUNT RATE [kcount/s] | 24.367 | 24.033 | 22.367 | 25.187 | 24.500 | 24.167 | 24.033 |
| DIFFRACTION RING |  |  |  |  |  |  |  |

| | MATERIAL | | | | | | |
|---|---|---|---|---|---|---|---|
| | SCM | | | | SUP | | |
| | THERMAL TREATMENT | | | | | | |
| | ANNEALING — | ANNEALING — | ANNEALING VACUUM CARBURIZATION | ANNEALING — | ANNEALING — | ANNEALING QUENCHING AND HV 500 | ANNEALING QUENCHING AND HV 450 |
| SHOT MATERIAL | RCW03PS | FeCrB80 | RCW03PS | — | RCW03PS | RCW03PS | RCW03PS |
| SHOT TECHNIQUE | | AIR TYPE | | | | AIR PRESSURE | |
| PROJECTION PRESSURE [MPa] | 0.1 | 0.1 | 0.1 | — | 0.1 | 0.1 | 0.1 |
| JETTING TIME [min] | 6 | 1 | 5 | — | 3 | 3 | 3 |
| RESIDUAL STRESS [MPa] | −35 | −24 | 11 | −31 | −32 | −32 | −31 |
| HALF-WIDTH [deg] | 2.51 | 2.55 | 2.69 | 2.5 | 2.52 | 2.54 | 2.48 |
| COUNT RATE [kcount/s] | 23.233 | 23.133 | 20.600 | 23.900 | 23.733 | 23.367 | 23.900 |
| DIFFRACTION RING |  |  |  |  |  |  |  |

| | MATERIAL | | | | |
|---|---|---|---|---|---|
| | SPCC | SPHC | S10C | SUP | STRAIN-FREE IRON POWDER |
| | THERMAL TREATMENT | | | | |
| | ANNEALING | ANNEALING | ANNEALING | ANNEALING | ANNEALING |
| SHOT MATERIAL | RCW03PS | RCW03PS | RCW03PS | SB25 | — |
| SHOT TECHNIQUE | AIR TYPE | AIR TYPE | AIR TYPE | IMPELLER TYPE | — |
| PROJECTION PRESSURE [MPa] | 0.1 | 0.1 | 0.1 | — | — |
| JETTING TIME [min] | 1 | 1 | 1 | — | — |
| RESIDUAL STRESS [MPa] | 11 | 52 | 30 | −30 | −1 |
| HALF-WIDTH [deg] | 2.32 | 2.36 | 2.49 | 2.5 | 2.88 |
| COUNT RATE [kcount/sec.] | 16.178 | 15.143 | 20.529 | 23.633 | 20.733 |
| DIFFRACTION RING |  |  |  |  |  |

| | MATERIAL | | | | |
|---|---|---|---|---|---|
| | SPCC | SPHC | S10C | SUP | STRAIN-FREE IRON POWDER |
| | THERMAL TREATMENT | | | | |
| | ANNEALING | ANNEALING | ANNEALING | ANNEALING | ANNEALING |
| SHOT MATERIAL | RCW03PS | RCW03PS | RCW03PS | SB25 | — |
| SHOT TECHNIQUE | AIR TYPE | AIR TYPE | AIR TYPE | IMPELLER TYPE | — |

TABLE 1-continued

| | | | | | |
|---|---|---|---|---|---|
| PROJECTION PRESSURE [MPa] | 0.1 | 0.1 | 0.1 | — | — |
| JETTING TIME [min] | 5 | 5 | 5 | — | — |
| RESIDUAL STRESS [MPa] | 18 | −12 | −32 | −26 | 7 |
| HALF-WIDTH [deg] | 2.36 | 2.5 | 2.51 | 2.45 | 2.88 |
| COUNT RATE [kcount/sec.] | 20.633 | 11.363 | 17.400 | 25.333 | 20.988 |
| DIFFRACTION RING |  |  |  |  |  |

The invention claimed is:

1. A manufacturing method for a reference piece for X-ray measurement of residual stress, comprising, after at least a portion of a surface of SCM (steel chromium molybdenum steel materials), SUP (spring steel steel materials), SPCC (normal steel), SPHC (general hot rolled steel materials), or S10C (carbon steel for machine structures) has been nanocrystallized by shot peening, stress is reduced while maintaining a micro state of nanocrystallized crystal grains by annealing the same and an orientation of metal crystal planes facing in the same direction generated by the manufacturing method is scattered by recrystallizing/micronizing the same by shot peening,
wherein the residual stress in the reference piece for X-ray measurement of residual stress is −55 MPa or greater and 55 MPa or less, and
wherein the shot peening is implemented with an air acceleration device with a projection air pressure in a range of 0.05-1.0 MPa.

2. The manufacturing method for a reference piece for X-ray measurement of residual stress according to claim 1, wherein a certain number of crystal grains for obtaining reliability in the X-ray measurement of residual stress are present within a range of the X-ray measurement of residual stress by shot peening.

3. The manufacturing method for a reference piece for X-ray measurement of residual stress according to claim 1, wherein nanocrystals are present on the metal material surface in a range of 0-50 μm.

4. The manufacturing method for a reference piece for X-ray measurement of residual stress according to claim 1, wherein the shot peening is implemented with a projected material having a Vickers hardness (JIS Z 2244) in a range of HV 1200-3000, and a grain size number (JIS R 6001) in a range of 20-220.

5. The manufacturing method for a reference piece for X-ray measurement of residual stress according to claim 1, wherein the shot peening is implemented with a projected material having a Vickers hardness (JIS Z 2244) in a range of HV 1700-3000, and a grain size number (JIS R 6001) in a range of 30-100.

6. The manufacturing method for a reference piece for X-ray measurement of residual stress according to claim 1, wherein the projection air pressure is in a range of 0.1-0.5 MPa.

7. The manufacturing method for a reference piece for X-ray measurement of residual stress according to claim 1, a number of times annealing is performed is from 3 to 5.

8. The manufacturing method for a reference piece for X-ray measurement of residual stress according to claim 1, wherein annealing is performed by using a bright annealing furnace.

9. The manufacturing method for a reference piece for X-ray measurement of residual stress according to claim 1, wherein annealing is performed to heat to 180-500° C.

10. The manufacturing method for a reference piece for X-ray measurement of residual stress according to claim 1, wherein annealing is performed to heat to 180-300° C.

* * * * *